US009964189B2

(12) United States Patent
Rodríguez Nájera et al.

(10) Patent No.: US 9,964,189 B2
(45) Date of Patent: May 8, 2018

(54) ROTARY ACTUATION DEVICE

(71) Applicant: Schweitzer Engineering Laboratories, Inc., Pullman, WA (US)

(72) Inventors: Gerardo Rodríguez Nájera, San Nicolas de los Garza (MX); Carlos Baltazar Castro Maciel, Soledad de Graciano Sanchez (MX); Sergio David Esquivel Álvarez, Valle de Campestre (MX)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 131 days.

(21) Appl. No.: 15/007,770

(22) Filed: Jan. 27, 2016

(65) Prior Publication Data

US 2017/0211669 A1    Jul. 27, 2017

(51) Int. Cl.
*F16H 21/44* (2006.01)
*F16H 21/54* (2006.01)
*F16H 25/18* (2006.01)

(52) U.S. Cl.
CPC .................................. *F16H 21/44* (2013.01)

(58) Field of Classification Search
CPC F16H 21/44; H01H 2071/665; H01H 50/641; H01H 71/68; H01H 71/66
See application file for complete search history.

(56) References Cited

U.S. PATENT DOCUMENTS

| | | | |
|---|---|---|---|
| 3,649,793 A | 3/1972 | MacLean | |
| 4,001,740 A | 1/1977 | MacLean | |
| 4,255,733 A | 3/1981 | MacLean | |
| 4,399,421 A | 8/1983 | MacLean | |
| 5,762,180 A | 6/1998 | Pomatto | |
| 6,015,958 A | 1/2000 | Pomatto | |
| 9,653,244 B1 | 5/2017 | Castro Maciel | |
| 9,741,519 B2 | 8/2017 | Castro Maciel | |
| 2013/0192965 A1* | 8/2013 | Cieply | H01H 3/02 200/337 |
| 2015/0213989 A1* | 7/2015 | Kasprzycki | H01H 71/68 307/130 |
| 2017/0207053 A1 | 7/2017 | Castro Maciel | |

\* cited by examiner

*Primary Examiner* — Jake Cook
(74) *Attorney, Agent, or Firm* — Jared L. Cherry; Richard M. Edge

(57) ABSTRACT

This disclosure relates to various embodiments of rotary actuation devices that may be utilized in a variety of applications. In one embodiment, a rotary actuation device is configured to transition between a first position and a second position in response to each of a manual adjustment, an activation of an electrical actuator, and a force generated by a deck device. The rotary actuation device may be at least one deck device configured to exert a force in response to a condition. The force may cause the rotary actuation device to transition between the first position and the second position. The rotary actuation device may further include an electrical actuator configured to generate a motion upon activation. A rotary latch mechanism coupled to the electrical actuator and may cause the rotary actuation device to transition from the first position to the second position.

21 Claims, 9 Drawing Sheets

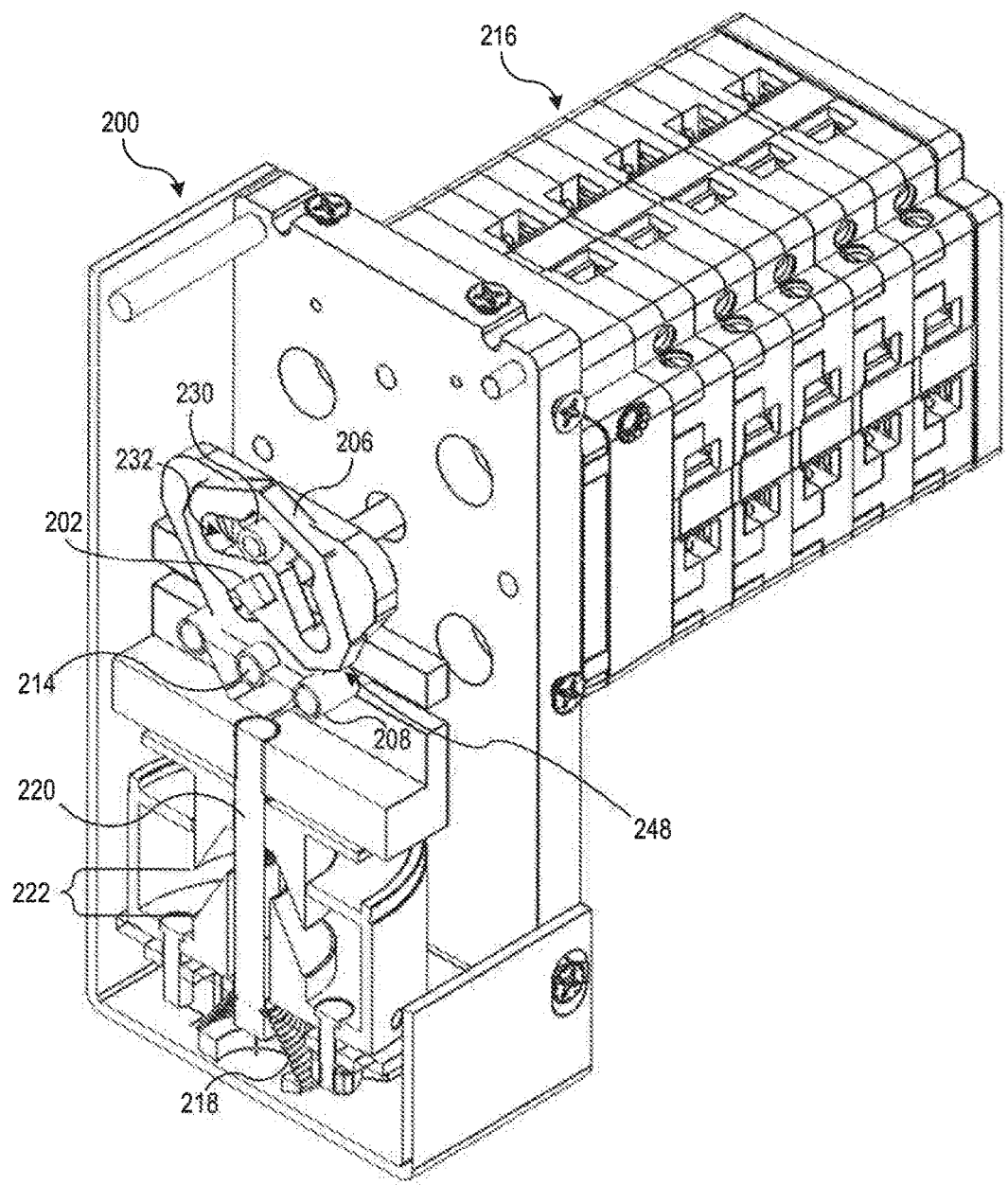

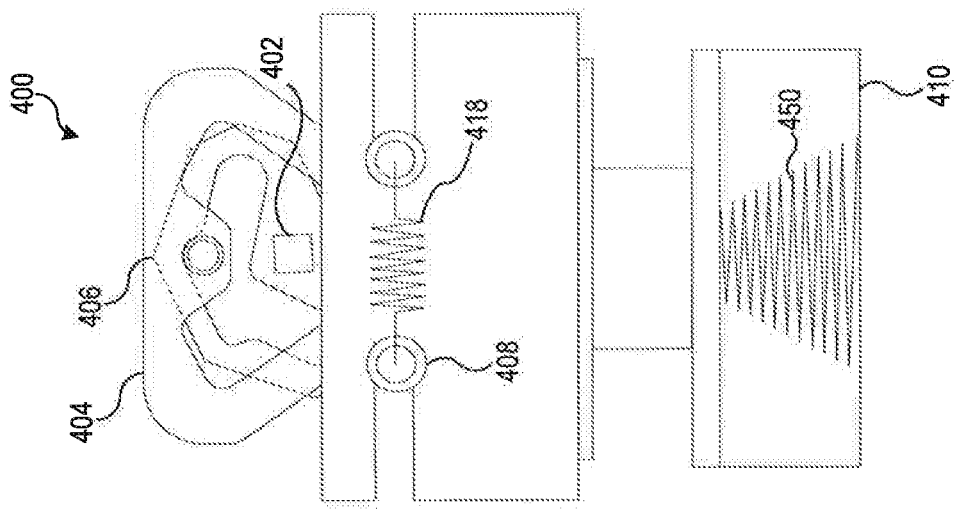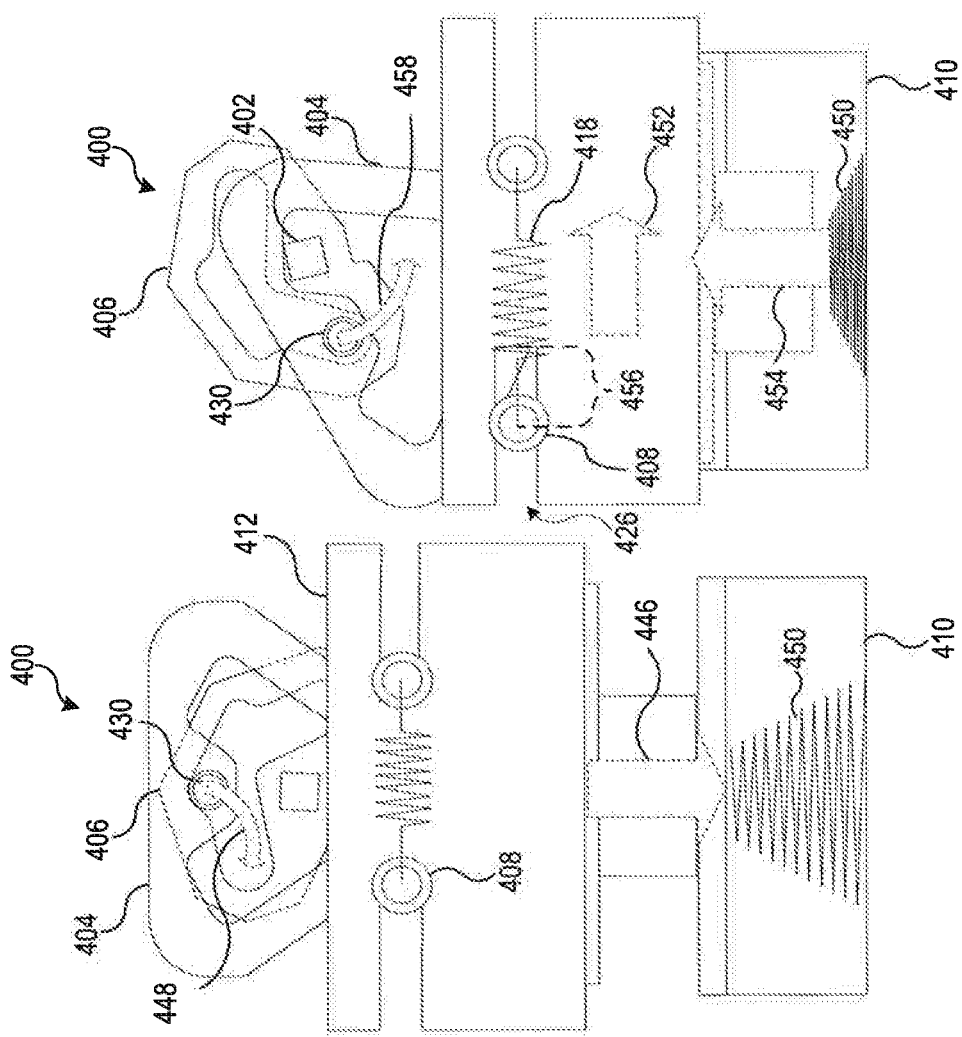

ROTARY ACTUATION DEVICE

TECHNICAL FIELD

This disclosure relates to various embodiments of rotary actuation devices that may be utilized in a variety of applications. More particularly but not exclusively, this disclosure relates to rotary actuation devices that may be utilized in electrical power systems and that may be actuated by each of a manual actuator, an electrical actuator, and a force generated by a deck device.

BRIEF DESCRIPTION OF THE DRAWINGS

Non-limiting and non-exhaustive embodiments of the disclosure are described, including various embodiments of the disclosure with reference to the figures, in which:

FIG. 2C illustrates a cross-sectional view of the rotary actuation device illustrated in FIG. 2A and taken along line 2C-2C.

FIG. 4A illustrates a rotary actuation device disposed in a first position prior to operation of a linear actuator consistent with embodiments of the present disclosure.

FIG. 4B illustrates the rotary actuation device of FIG. 4A and disposed in a transitory state during operation of the linear actuator consistent with embodiments of the present disclosure.

FIG. 4C illustrates the rotary actuation device of FIG. 4A and disposed in a second position following operation of the linear actuator consistent with embodiments of the present disclosure.

DETAILED DESCRIPTION

Figure 1:
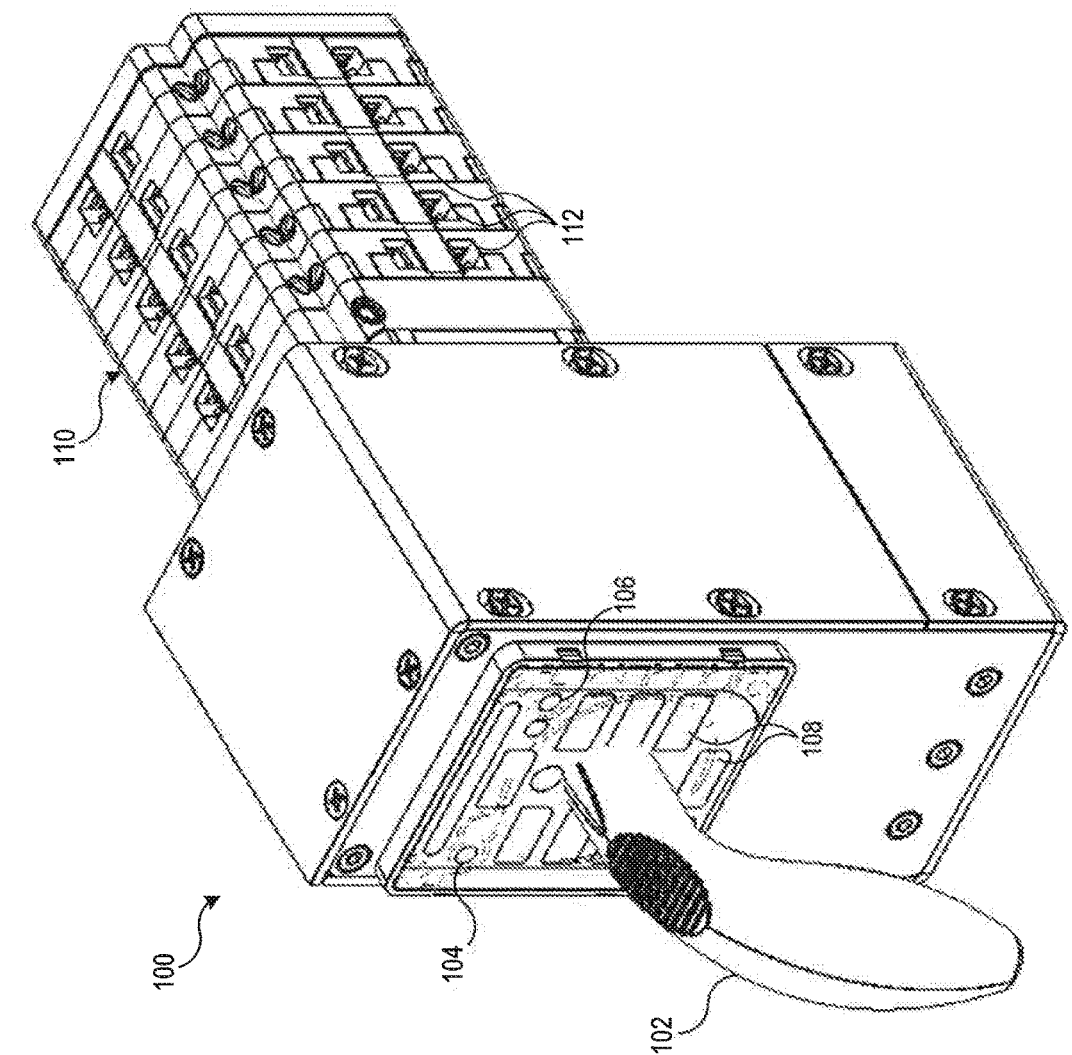
FIG. 1 illustrates a perspective view of a rotary actuation device consistent with embodiments of the present disclosure.

Disclosed herein are various embodiments of rotary actuation devices that may be utilized in a variety of applications. In some embodiments, the rotary actuation device may be used to select between two or more positions. The positions of the rotary actuation device may be used to selectively activate components (e.g., to designate an ON or an OFF condition), for measuring instrument circuits (e.g., measuring A, B, or C phases in a multi-phase power system), or for other purposes. Still further, rotary actuation devices consistent with the present disclosure may be used to manually or electrically open and close breakers, to manually or electrically connect or disconnect switches, and to selectively activate a variety of types of equipment.

A rotary actuation device consistent with the present disclosure may be transitioned through two or more positions by manual action or by electrical actuation. In various embodiments, rotary actuation devices consistent with the present disclosure may include positions associated with the open and closed positions of a plurality of deck devices associated with the rotary actuation device. In some embodiments, the deck devices may comprise electrical contact modules. A plurality of deck devices associated with the rotary actuation device may be actuated together. In some embodiments, as many as ten deck devices may be controlled by a rotary actuation device.

Electrical power generation and distribution systems are designed to generate, transmit, and distribute electrical energy to loads. Electrical power generation and distribution systems may include equipment, such as electrical generators, electrical motors, power transformers, power transmission and distribution lines, circuit breakers, switches, buses, transmission lines, voltage regulators, capacitor banks, and the like. Such equipment may be monitored, controlled, automated, and/or protected using intelligent electronic devices ("IEDs") that receive electric power system information from the monitored equipment, make decisions based on the information, and provide monitoring, control, protection, and/or automation outputs to the monitored equipment. Provided above is an exemplary, non-exhaustive list of equipment in an electrical power generation and distribution system that may be referred to herein as monitored equipment. The term monitored equipment, as used herein, refers to any device that may be monitored, controlled, and/or automated using an IED.

An IED or other control device in an electric power system may be configured to provide a control input to a rotary actuation device in some embodiments consistent with the present disclosure. A rotary actuation device consistent with the present disclosure may be selectively actuated based on the control input to change a position of the rotary actuation device. As a result of such a change, equipment connected to the rotary actuation device may be activated, deactivated, or adjusted. In some embodiments, an IED may include, for example, remote terminal units, differential relays, distance relays, directional relays, feeder relays, overcurrent relays, voltage regulator controls, voltage relays, breaker failure relays, generator relays, motor relays, automation controllers, bay controllers, meters, recloser controls, communication processors, computing platforms, programmable logic controllers ("PLCs"), programmable automation controllers, input and output modules, governors, exciters, statcom controllers, SVC controllers, OLTC controllers, and the like. Further, in some embodiments, IEDs may be communicatively connected via a network that includes, for example, multiplexers, routers, hubs, gateways, firewalls, and/or switches to facilitate communications on the networks, each of which may also function as an IED. Networking and communication devices may also be integrated into an IED and/or be in communication with an IED. As used herein, an IED may include a single discrete IED or a system of multiple IEDs operating together.

The embodiments of the disclosure will be best understood by reference to the drawings. It will be readily understood that the components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor do the steps need to be executed only once, unless otherwise specified.

In some cases, well-known features, structures, or operations are not shown or described in detail. Furthermore, the described features, structures, or operations may be combined in any suitable manner in one or more embodiments. It will also be readily understood that the components of the embodiments, as generally described and illustrated in the figures herein, could be arranged and designed in a wide variety of different configurations.

FIG. 1 illustrates a perspective view of a rotary actuation device 100 consistent with embodiments of the present disclosure. The rotary actuation device 100 includes a handle 102 that may be used to manually actuate the rotary actuation device 100 through a variety of positions. In some embodiments, rotary actuation device 100 may be configured for mounting in a rack. A plurality of labels 108 may be disposed at various positions on the face of the rotary actuation device 100. Although eight positions are illustrated, in some embodiments, fewer positions may be utilized. A plurality of status indicators 104, 106 may be disposed on the face of the rotary actuation device 100. In some embodiments, the status indicators 104, 106 may comprise multi-color light emitting diodes configured to provide information to a user. In one specific embodiment, status indicator 104 may be illuminated by the occurrence of a trip event, and status indicator 106 may be illuminated when the rotary actuation device is in a closed position.

In the illustrated embodiment, a plurality of contact modules 110 is associated with rotary actuation device 100. The contact modules 110 may be arranged in a plurality of decks. In the illustrated embodiment, four decks are shown. A plurality of conductors may be wired into apertures 112, and operation of rotary actuation device 100 may selectively connect or disconnect the plurality of contact modules 110.

In some embodiments, one or more deck devices may comprise an overcurrent protection element (e.g., an electrical breaker). In response to an overcurrent condition, one or more of the overcurrent protection elements may trip to prevent damage resulting from the overcurrent condition. The trip action of one or more deck devices may trip all of the associated contact modules.

Figure 2A:
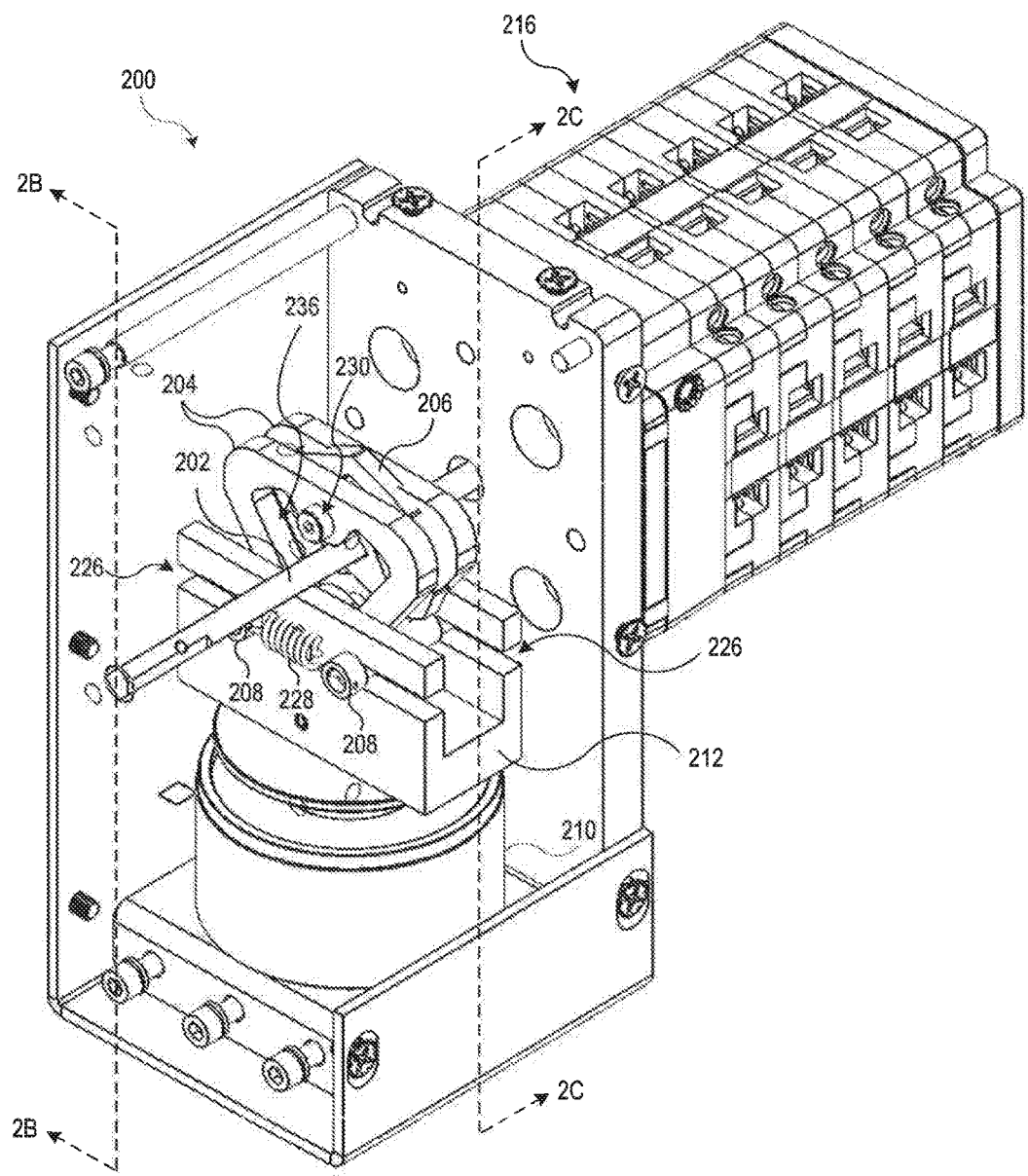
FIG. 2A illustrates a perspective view of interior components of a rotary actuation device consistent with embodiments of the present disclosure.

FIG. 2A illustrates a perspective view of interior components of a rotary actuation device 200 consistent with embodiments of the present disclosure. A rotary shaft 202 may be used to couple together a manual actuator (not shown) (e.g., a handle), the illustrated interior components, and a plurality of deck devices 216. In the illustrated embodiment, the rotary shaft 202 comprises a unitary structure extending through the rotary actuation device 200 and through the deck devices as best shown in FIG. 2C.

A rocker 204 may include an aperture 236 through which the rotary shaft 202 may pass. The rocker 204 is disposed between a biasing mechanism including two spring pins 208 held within a rocker holder 212 and joined by a spring 228. A rotary plate 206 may be disposed between two lobes of the rocker holder 212. A rotary plate pin 230 is disposed between the lobes of the rocker 204. The rotary plate is supported by the rotary plate pin 230, which extends through a rotary plate aperture 232, as best shown in FIG. 2C. As will be described in greater detail in connection with subsequent figures, during electrical actuation of the rotary actuation device, the rocker 204 may pivot with respect to the rocker holder 212, and the interaction between the rocker 204, the rotary plate 206, and the spring pins 208 may cause the rotary actuation device to change pivot as a result. The pivoting motion of the rocker displaces the spring pins 208 and permits the rotary plate 206 to rotate beyond a range of rotation available for manual actuation.

The rocker holder 212 is disposed atop an electrical actuator 210 in the illustrated embodiment. The rocker holder 212 includes channels 226 configured to receive spring pins 208. The channels 226 cause spring pins 208 to move horizontally when sufficient force is applied to overcome the tension of spring 228. As will be described in greater detail in connection with subsequent figures, the electrical actuator 210 may be configured to produce a motion in response to a control signal. In response to such motion, the shape of the rocker 204 may cause the spring pins 208 to move along one or both of channels 226. As a result, the spring 228 may stretch and therefore create a restoring force that is opposite to the direction in which the rocker pivots in response to the motion. In some embodiments, the electrical actuator 210 may comprise a linear actuator, such as a solenoid.

Figure 2B:
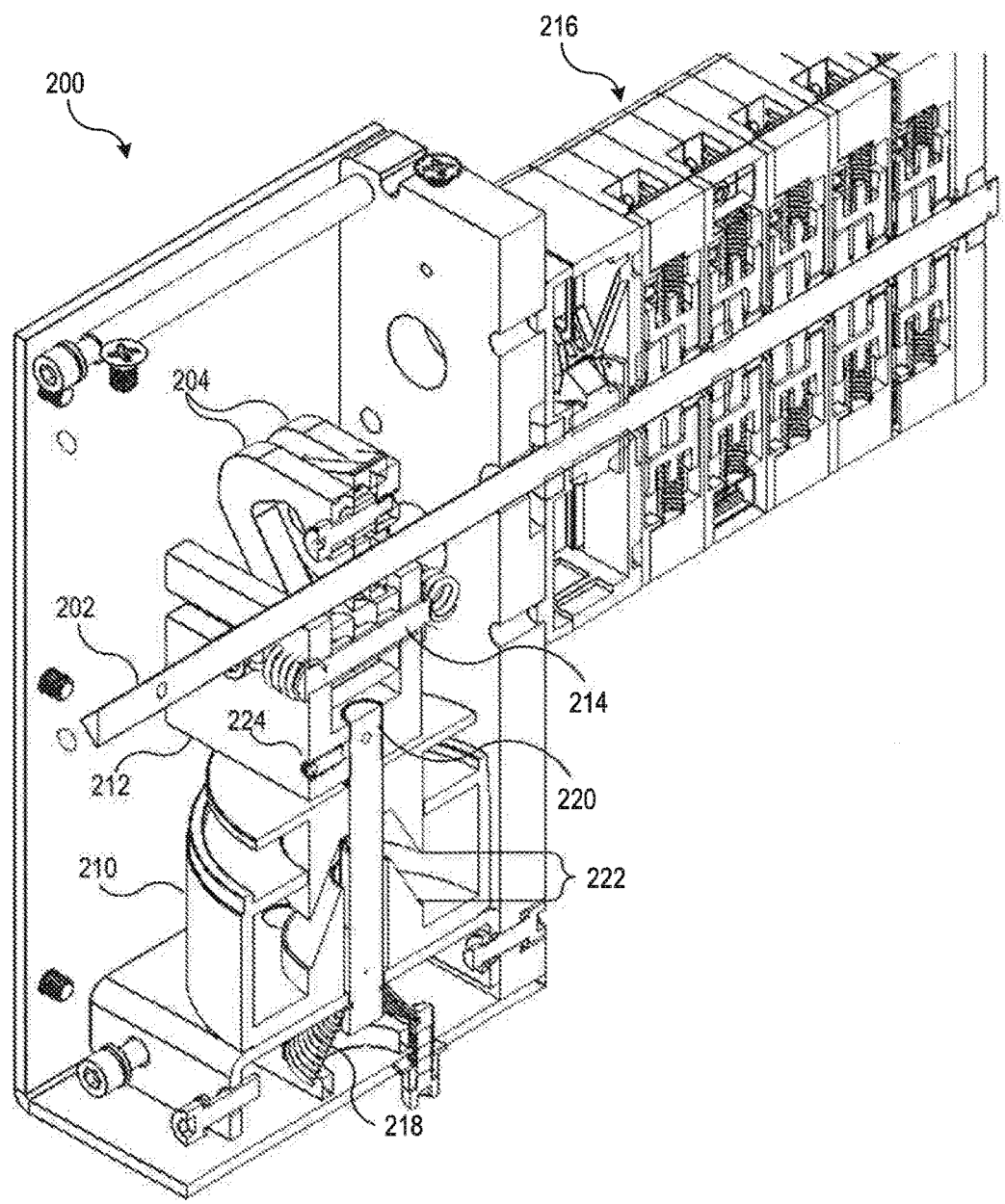
FIG. 2B illustrates a cross-sectional view of the rotary actuation device illustrated in FIG. 2A and taken along line 2B-2B consistent with embodiments of the present disclosure.

FIG. 2B illustrates a cross-sectional view of the rotary actuation device 200 illustrated in FIG. 2A and taken along line 2B-2B consistent with embodiments of the present disclosure. As illustrated in FIG. 2B, the rotary shaft 202 extends through the rotary actuation device 200 and through the deck devices 216. As such, rotation of the rotary shaft 202 may simultaneously actuate the deck devices 216. Similarly, an action by one or more of the deck devices (e.g., one of the deck devices tripping) may cause the rotary actuation device to actuate along with all other deck devices.

An actuator shaft 220 is connected to an actuator spring 218. The actuator spring 218 may be configured to bias the actuator shaft 220 upward. The actuator shaft 220 may be connected to the rocker holder 212 by a pin 224, and movement of the actuator shaft 220 may be translated to the rocker holder 212. A downward motion created by linear actuator 210 exerts a downward force on the actuator shaft 220, the actuator spring 218, and the rocker holder 212. The downward force may cause the actuator spring 218 to compress, and may cause the rocker holder 212 to move downward a travel distance 222. In various embodiments, the electrical actuator 210 may comprise a solenoid. In such embodiments, the application of an electrical potential to the solenoid may result in linear movement of the actuator shaft 220.

A rocker pin 214 may connect rocker 204 to the rocker holder 212. The rocker pin 214 may be received within an aperture in rocker holder 212. The configuration may permit rocker 204 to pivot about the rocker pin 214. As shown in FIG. 2A, the spring pins 208 may exert a biasing force that holds the rocker 204 in the illustrated position; however, an exertion of force may cause spring pins 208 to move horizontally through channels 226 in the rocker holder 212.

FIG. 2C illustrates a cross-sectional view of the rotary actuation device 200 as illustrated in FIG. 2A and taken along line 2C-2C. As illustrated in FIG. 2C, the rotary plate pin 230 extends through a rotary plate aperture 232. The rotary plate 206 interacts at position 248 with spring pins 208 in the illustrated position to limit the rotational movement of the shaft 202. As may be appreciated, if the shaft 202 were rotated in the counterclockwise direction, the opposite edge of rotary plate 206 would interact with the rotary pin on the opposite side to limit the rotational movement. The illustrated position and together with the position realized by counterclockwise rotation of the rotary shaft 202 until the rotary plate 206 comes into contact with the other spring pin 208 may represent two positions of the rotary actuation device 200. The spring pins 208 may create a range of rotation of the manual actuator. These positions may, in some embodiments, correspond to an open and closed position of the deck devices 216. These positions may be achieved by manual rotation of the rotary shaft 202 using a handle (not shown) or by virtue of one or more deck devices 216 tripping and exerting a rotational force on the rotational shaft 202.

Figure 2D:
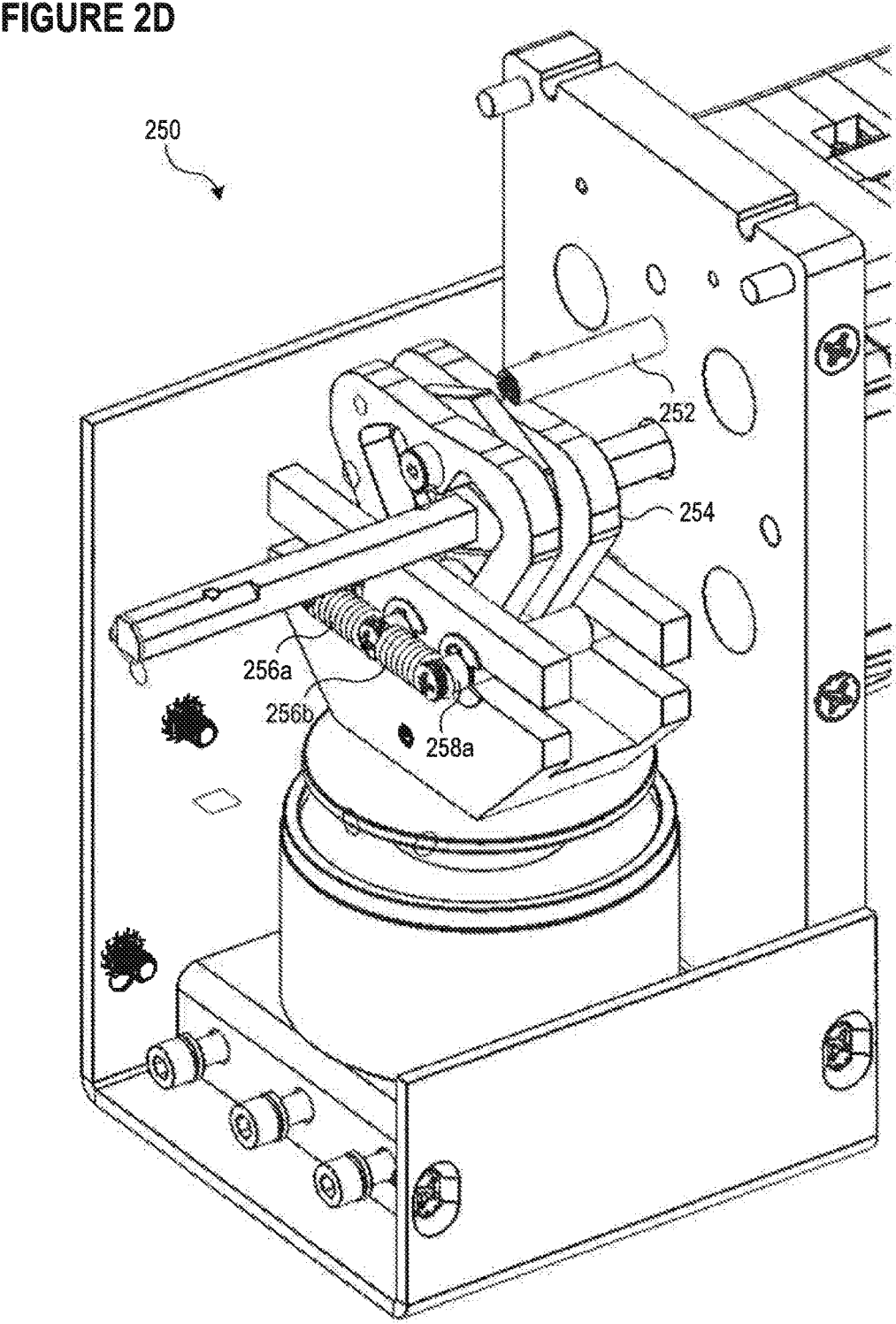
FIG. 2D illustrates a perspective view of interior components of another embodiment of a rotary actuation device consistent with other embodiments of the present disclosure.

FIG. 2D illustrates a perspective view of interior components of another embodiment of a rotary actuation device 250 consistent with other embodiments of the present disclosure. Rotary actuation device 250 may operate in a similar manner to rotary actuation device 200 illustrated in FIGS. 2A-2C other than the differences described or illustrated. A stabilizing rod 252 may be in contact with rocker 254. The opposite sides of the top of rocker 254 may have a slope toward the center of rocker 254 that facilitates maintaining rocker 254 in the illustrated position. Stablizing rod 252 and/or the shape of rocker 254 may improve the stability of the rotary latch mechanism during manual actuation and/or in response to vibration. A pair of springs 256a, 256b coupled to a central point about which rocker 254 may pivot may be coupled to spring pins disposed on opposite sides of rocker 254. Spring pin 258a is illustrated. Springs 256a, 256b may improve the stability of rotary actuation device 250 during manual actuation and/or in response to vibration.

Figure 3A:
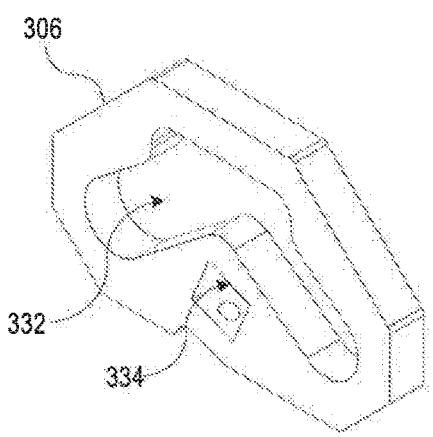
FIG. 3A illustrates an isometric view of a rotary plate consistent with embodiments of the present disclosure.

FIG. 3A illustrates an isometric view of a rotary plate 306 consistent with embodiments of the present disclosure. The rotary plate 306 may include a rotary plate aperture 332 configured to receive a rotary plate pin (not shown). In the illustrated embodiment, the rotary plate aperture 332 has a substantially "V" shaped configuration. In alternative embodiments, other shapes are also contemplated, such as an "L" shape. The rotary plate may further include a rotary shaft aperture 334 configured to receive a rotary shaft (not shown). The rotary shaft aperture 334 may be configured such that rotation of the rotary shaft results in rotation of the rotary plate and vice versa.

Figure 3B:
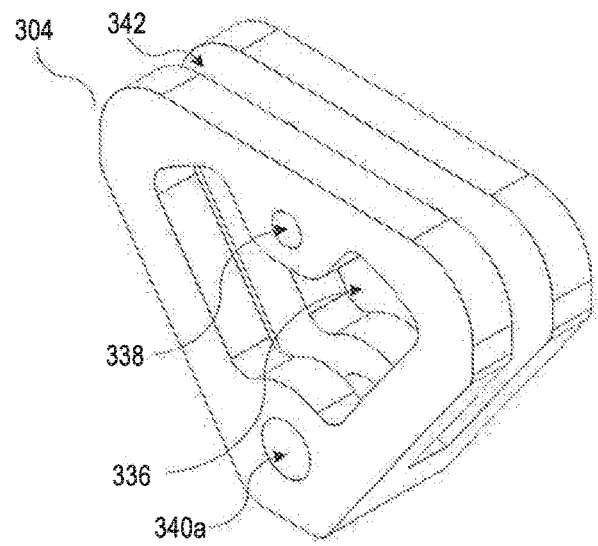
FIG. 3B illustrates an isometric view of a rocker consistent with embodiments of the present disclosure.

FIG. 3B illustrates an isometric view of a rocker 304 consistent with embodiments of the present disclosure. The rocker 304 includes two lobes separated by a rotary plate gap 342 configured to receive the rotary plate 306 illustrated in FIG. 3A. A rotary plate pin (not shown) may be disposed in a rotary plate pin aperture 338. The rotary plate pin (not shown) may extend through the rotary plate aperture 332. A rocker pin (not shown) may be received in rocker pin aperture 340a and may be used to couple the rocker 304 to the rocker housing 312 shown in FIG. 3C. Rocker 304 includes a rocker aperture 336. In various embodiments, a rotary shaft (not shown) may extend through the rocker aperture 336.

Figure 3C:
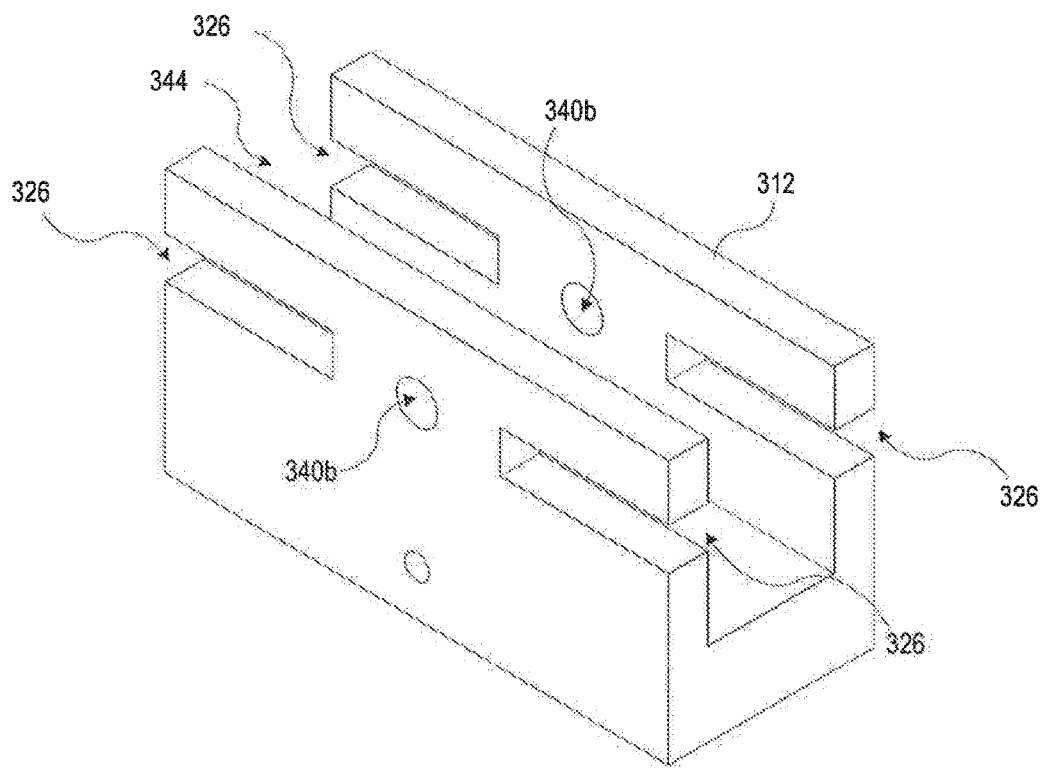
FIG. 3C illustrates an isometric view of a rocker holder consistent with embodiments of the present disclosure.

FIG. 3C illustrates an isometric view of a rocker holder 312 consistent with embodiments of the present disclosure. The rocker holder 312 may be configured to receive the rocker 304 illustrated in FIG. 3B in a rocker gap 344. The rocker 304 may be secured to the rocker holder 312 using a rocker pin (not shown) inserted into rocker pin aperture 340b in rocker holder 312 and rocker pin aperture 340a illustrated in FIG. 3B. Rocker holder 312 also includes channels 326 configured to receive spring pins (not shown).

Figure 3D:
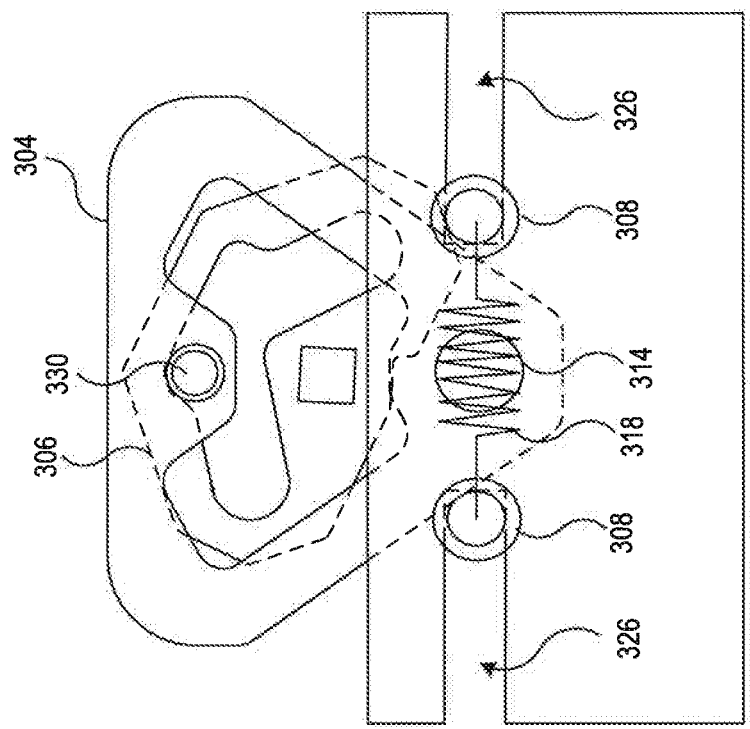
FIG. 3D illustrates a front view of a rotary latch mechanism including the rotary plate illustrated in FIG. 3A, the rocker illustrated in FIG. 3B, the rocker holder illustrated in FIG. 3C, and a biasing mechanism of a rotary actuation device in a first position consistent with embodiments of the present disclosure.

FIG. 3D illustrates a front view of a rotary latch mechanism including the rotary plate 306 of FIG. 3A, the rocker 304 of FIG. 3B, the rocker holder 312 of FIG. 3C, and a biasing mechanism a rotary actuation device in a first position consistent with embodiments of the present disclosure. In various embodiments, the spring pins may be centered about the rocker pin aperture 340a. As illustrated, the spring pins 308 may abut opposite sides of the rocker 304. Further, the rocker pin 314 may connect the rocker 304 to the rocker holder 312. As such, the spring pins 308 may bias the rocker 304 into the illustrated orientation. In the illustrated orientation, a line of symmetry of the rocker 304 is substantially perpendicular to the orientation of the channels 326. The left edge of rotary plate 306 is also in contact with spring pin 308. The contact between the rotary plate 306 and the left spring pin 308 limits counterclockwise rotation of the rotary plate, thus creating a range of rotation of the manual actuator.

Figure 3E:
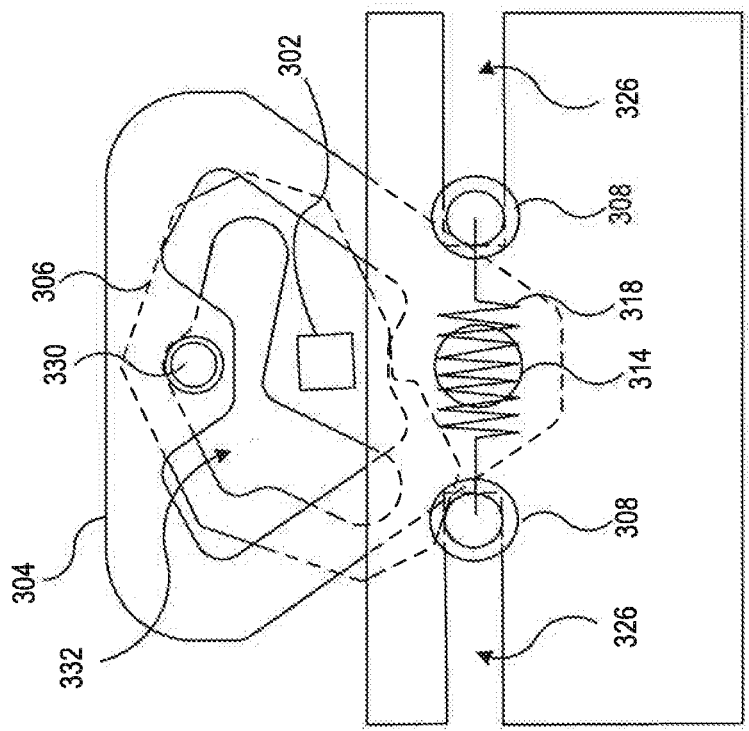
FIG. 3E illustrates a front view of a rotary latch mechanism including the rotary plate illustrated in FIG. 3A, the rocker illustrated in FIG. 3B, the rocker holder illustrated in FIG. 3C, and a biasing mechanism of a rotary actuation device in a second position consistent with embodiments of the present disclosure.

FIG. 3E illustrates a front view of a rotary latch mechanism including the rotary plate 306 of FIG. 3A, the rocker 304 of FIG. 3B, the rocker holder 312 of FIG. 3C, and a biasing mechanism a rotary actuation device in a second position consistent with embodiments of the present disclosure. As may be appreciated, the rotary device may be transitioned from the first position (shown in FIG. 3D) to the second position (shown in FIG. 3E) by a clockwise rotation of rotary shaft 302. The shape of rotary plate aperture 332 accommodates the rotation of rotary shaft 302 as rotary plate pin 330 transitions from the right side of rotary plate 306 to the left side of rotary plate 306. In some embodiments, the first position and second position illustrated in FIGS. 3D and 3E may correspond to positions of a rotary actuation device that may be selected by manual operation. In such embodiments, the two positions may correspond to an open and a closed position.

As may be appreciated by inspection of FIGS. 3D and 3E, the exertion of a force on either the left or right side of the rocker 304 may cause the rocker 304 to push one of the spring pins 308 along its respective channel 326. As the spring pin moves along its respective channel, the rocker 304 may pivot about rocker pin 314 in the direction of the force. The spring 318 may stretch to accommodate the displacement of the spring pin 308; however, as the spring 318 stretches, it exerts a restoring force tending to return the spring pin 308 to its initial position. As the spring pin 308 returns to its initial position, it exerts a force on the rocker in the direction opposite to the direction in which the rocker pivoted. As such, when the force on either the left or right side of the rocker 304 is discontinued, the spring 318 may cause the spring pins 308 and the rocker 304 to return to the orientation illustrated in FIGS. 3D and 3E.

Figure 3F:
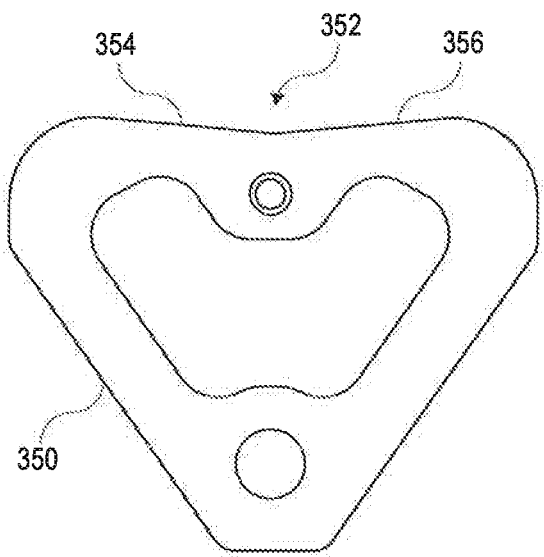
FIG. 3F illustrates a front view of another embodiment of a rocker consistent with embodiments of the present disclosure.

FIG. 3F illustrates an front view of another embodiment of a rocker 350 consistent with embodiments of the present disclosure. Rocker 350 may operate in a similar manner to rocker 304 illustrated in FIG. 3B other than the differences described or illustrated. In contrast to rocker 304 illustrated in FIG. 3B, opposite the top of rocker 350 slopes toward the midline of rocker 350 and creates a valley 352. More specifically a first sloped section 354 and a second sloped section 356 may slope toward the midline of rocker 350 to create valley 352. A stabilizing rod (such as stabilizing rod 252 illustrated in FIG. 2D) may settle into a valley 352, thus tending to maintain rocker 350 in the orientation illustrated in FIG. 3F. The use of a stablizing rod may improve the stability of the rocker 352 during manual actuation and/or in response to vibration.

Figure 3G:
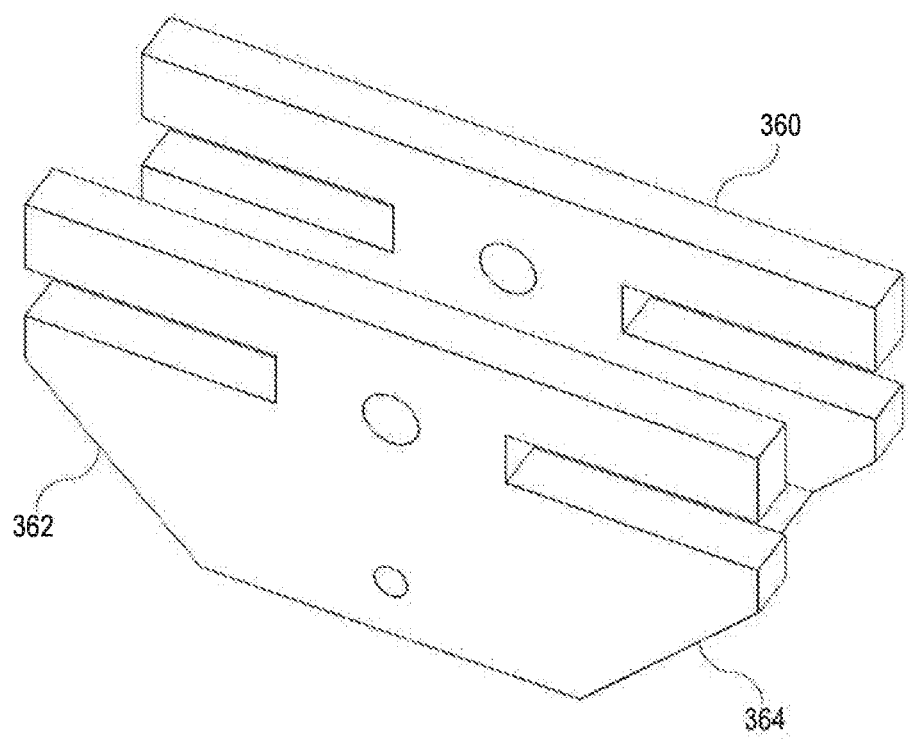
FIG. 3G illustrates an isometric view of another embodiment of a rocker holder consistent with embodiments of the present disclosure.

FIG. 3G illustrates an isometric view of another embodiment of a rocker holder 360 consistent with embodiments of the present disclosure. Rocker holder 360 may operate in a similar manner to rocker holder 312 illustrated in FIG. 3C other than the differences described or illustrated. Rocker holder 360 includes angled corners 362, 364, which may reduce the material needed to form and the weight of rocker holder 360 in comparison to rocker holder 312 illustrated in FIG. 3C.

FIG. 4A illustrates a rotary actuation device 400 disposed in a first position prior to operation of an electrical actuator 410 consistent with embodiments of the present disclosure. The rotary actuation device 400 includes a rocker holder 412, a rocker 404, and a rotary plate 406. The rotary plate 406 may be disposed on a rotary plate pin 430 that is coupled to the rocker 404. An arrow 446 illustrates the direction of a motion created by electrical actuator 410. In one embodiment, electrical actuator 410 may comprise a solenoid that may be activated by the application of an electrical potential. The downward motion created by the electrical actuator 410 causes the rotary plate pin 430 to move in the direction shown by arrow 448. Specifically, the rotary plate 406 is slightly off center in the first position, and as such, the downward motion causes the rotary plate pin 430 to move through toward the left side of the rotary plate 406. The downward motion of the linear actuator 410 may also compress an actuator spring 450.

FIG. 4B illustrates the rotary actuation device 400 of FIG. 4A and disposed in a transitory position during operation of the electrical actuator 410 consistent with embodiments of the present disclosure. The linear motion of the electrical actuator 410 results in the rotary plate pin 430 moving the left-most end of the rotary plate 406. The rotary plate 406 rotates around the rotary shaft 402, resulting in a force that causes rocker 404 to pivot in a counterclockwise direction. The movement of the rocker 404 in the counterclockwise direction causes spring pin 408 to move horizontally along channel 426 a distance 456. The movement of spring pin 408 stretches spring 418. The stretching of spring 418 results in spring 418 exerting a force in the direction shown by arrow 452. Further, the compression of actuator spring 450 results in an upward force 454. The combination of these forces results in the rotary plate pin 430 moving in the direction illustrated by arrow 458.

FIG. 4C illustrates the rotary actuation device 400 of FIG. 4A and disposed in a second position following operation of the electrical actuator 410 consistent with embodiments of the present disclosure. Following operation of the linear actuator, the forces illustrated by arrows 452, 454 in FIG. 4B, cause the rotary actuation device 400 to settle in the second position. Specifically, as spring 418 returns to its original position, spring pin 408 biases rocker 404 toward the center. This motion, combined with the upward motion created by spring 450 causes rotary plate 406 to complete a nearly full rotation about the rotary shaft 402. In comparing FIG. 4A and FIG. 4C, it may be noted that the rotary shaft 402 does not complete a full rotation.

The operation that resulted in transitioning the rotary actuation device 400 from the first position, as shown in FIG. 4A, to the second position, as shown in FIG. 4C, may also be operated in the reverse order. For example, if the linear actuator were activated in the second position, the result would be that the rotary actuation device 400 would return to the first position.

As may be appreciated, the rotary actuation device 400 may also be manually transitioned between the first position, as shown in FIG. 4A, and the second position, as shown in FIG. 4C. Specifically, the rotary shaft 402 may be rotated counterclockwise using a handle (not shown) to cause the change in position of the rotary plate pin from the first position to the second position. In various embodiments, the positions illustrated in FIG. 4A and FIG. 4C may correspond in some embodiments to an open position and closed position of a plurality of deck devices (not shown) associated with the rotary actuation device 400. Accordingly, such embodiments may allow for manual changes between the first position and the second position, as well as changes between the first position and the second position resulting from operation of the linear actuation component.

It will be understood by those having skill in the art that many changes may be made to the details of the above-described embodiments without departing from the underlying principles of the invention. For example, any suitable combination of various embodiments disclosed herein, or the features, elements, or components thereof, is contemplated, irrespective of whether such features, elements, or components are explicitly disclosed as being part of a single exemplary embodiment.

It should also be understood that terms such as "right," "left," "top," "bottom," "above," and "side," as used herein, are merely for ease of description and refer to the orientation of the components as shown in the figures. It should be understood that any orientation of the components described herein is within the scope of the present disclosure.

Throughout this specification, any reference to "one embodiment," "an embodiment," or "the embodiment" means that a particular feature, structure, or characteristic described in connection with that embodiment is included in at least one embodiment. Thus, the quoted phrases, or variations thereof, as recited throughout this specification are not necessarily all referring to the same embodiment.

Similarly, it should be appreciated that in the above description of embodiments, various features are sometimes grouped together in a single embodiment, figure, or description thereof for the purpose of streamlining the disclosure. This method of disclosure, however, is not to be interpreted as reflecting an intention that any claim require more features than those expressly recited in that claim. Rather, inventive aspects lie in a combination of fewer than all features of any single foregoing disclosed embodiment.

A variety of modifications in and to the embodiments and implementations disclosed herein will be apparent to those persons skilled in the art. Accordingly, no limitation on the invention is intended by way of the foregoing description and accompanying drawings, except as set forth in the appended claims.

The invention claimed is:

1. A rotary actuation device configured to transition between a first position and a second position in response to each of a manual adjustment, an activation of an electrical actuator, and an action of a deck device, the rotary actuation device comprising:
a manual actuator configured to permit a manual transition of the rotary actuation device between the first position and the second position;
an electrical actuator configured to generate a motion upon electrical activation;
a rotary latch mechanism configured to translate the motion of the electrical actuator to cause the rotary actuation device to transition from the first position to the second position, the rotary latch mechanism comprising:
a rocker;
a rocker housing coupled to the rocker, the rocker housing comprising:
a rocker pin configured to couple to the rocker and to permit the rocker to pivot with respect to the rocker pin in a direction;
a biasing mechanism configured to exert a restoring force on the rocker in response to the rocker pivoting in the direction, the biasing mechanism exerting the restoring force opposite to the direction;
a rotary plate supported by the rocker and configured to limit a range of rotation of the manual actuator between the first position and the second position by interaction with the biasing mechanism;
wherein the motion causes the rocker to pivot and to displace the biasing mechanism, and the motion further causes the rotary plate to rotate beyond the range of rotation of the manual actuator.

2. The rotary actuation device of claim 1, further comprising:
a rotary shaft coupled to the manual actuator, the rotary latch mechanism, and at least one deck device.

3. The rotary actuation device of claim 2, wherein the at least one deck device is configured to cause the rotary actuation device to transition between the first position and the second position in response to a condition.

4. The rotary actuation device of claim 3, where in the at least one deck device comprises an overcurrent protection device, and the condition comprises an overcurrent event.

5. The rotary actuation device of claim 3, wherein the first position corresponds to a closed position of the at least one deck device and wherein the second position corresponds to an open position of the at least one deck device.

6. The rotary actuation device of claim 1, wherein the electrical actuator comprises a linear actuator.

7. The rotary actuation device of claim 1, wherein the rotary plate comprises a rotary plate aperture configured to receive a rotary plate pin coupled to the rocker.

8. The rotary actuation device of claim 7, wherein the rotary plate aperture comprises a substantially "V" shaped configuration.

9. The rotary actuation device of claim 1, wherein the rocker comprises a rocker aperture and the rotary shaft passes through the rocker aperture.

10. The rotary actuation device of claim 1, wherein the rotary latch mechanism is further configured to cause the rotary actuation device to transition from the second position to the first position in response to the motion of the electrical actuator.

11. The rotary actuation device of claim 1, further comprising a stabilizing rod in contact with the rocker;
wherein in the rocker is comprises a first sloped section and a second sloped section, the first sloped section and the second sloped section defining a valley at a midline of the rocker, and the stabilizing rod is configured to be received within the valley.

12. The rotary actuation device of claim 1, wherein the biasing mechanism further comprises:
a first channel configured to receive a first pin
a second channel configured to receive a second pin;
a spring connecting the first pin and the second pin, and
wherein the biasing force is created by the spring configured and the default position comprises an orientation of the rocker that is substantially perpendicular to the first channel and the second channel.

13. A rotary actuation device configured to transition between a first position and a second position in response to each of a manual adjustment, an activation of an electrical actuator, and an action of a deck device, the rotary actuation device comprising:
a rotary shaft;
at least one deck device in contact with the rotary shaft and configured to exert a force on the rotary shaft in response to a condition and the force causes the rotary actuation device to transition between the first position and the second position;
a manual actuator configured to permit a user to manually transition the rotary actuation device between the first position and the second position;
an electrical actuator configured to generate a motion upon activation;
a rotary latch mechanism configured to couple to the electrical actuator and the rotary shaft and configured to translate the motion of the electrical actuator to rotate the rotary shaft and to cause the rotary actuation device to transition from the first position to the second position.

14. The rotary actuation device of claim 1, wherein the electrical actuator comprises a linear actuator.

15. The rotary actuation device of claim 14, wherein the electrical actuator comprises a linear actuator and an actuation shaft coupled to the rotary latch mechanism, such that the motion comprises a linear motion of at least a portion of the rotary latch mechanism.

16. The rotary actuation device of claim 1, where in the at least one deck device comprises an overcurrent protection device, and the condition comprises an overcurrent event.

17. The rotary actuation device of claim 1, where in the rotary latch mechanism comprises:
a rotary plate in contact with the rotary shaft, the rotary plate configured to limit the rotation of the manual actuator between the first position and the second position.

18. The rotary actuation device of claim 17, further comprising:
a first pin disposed within a first channel;
a second pin disposed within a second channel;
wherein the rotary plate is configured to contact the first pin in the first position and configured to contact the second pin in the second position.

19. The rotary actuation device of claim 17, wherein the rotary latch mechanism further comprises:
a rocker configured to support the rotary plate on a rotary plate pin, the rocker being disposed between the first pin and the second pin;
a spring connecting the first pin and the second pin, the spring configured to exert a biasing force on the rocker to restore the rocker to an orientation that is substantially perpendicular to the first channel and the second channel.

20. The rotary actuation device of claim 19, further comprising a rocker housing comprising rocker pin configured to couple to the rocker and to permit the rocker to pivot with respect to the rocker pin, wherein the rocker housing further comprises the first channel and the second channel.

21. The rotary actuation device of claim 19, wherein the rotary plate further comprises a rotary plate aperture configured to receive the rotary plate pin.

\* \* \* \* \*